United States Patent [19]

Carrea et al.

[11] Patent Number: 6,017,502

[45] Date of Patent: Jan. 25, 2000

[54] HYDROGEN PURIFICATION USING METAL HYDRIDE GETTER MATERIAL

[75] Inventors: Giovanni Carrea; Brian D. Warrick, both of Colorado Springs, Colo.

[73] Assignee: D.D.I., Limited, Grand Turks, Turks/Caicos Islands

[*] Notice: This patent issued on a continued prosecution application filed under 37 CFR 1.53(d), and is subject to the twenty year patent term provisions of 35 U.S.C. 154(a)(2).

[21] Appl. No.: 08/951,707

[22] Filed: Oct. 16, 1997

Related U.S. Application Data

[63] Continuation of application No. 08/546,129, Oct. 20, 1995, abandoned.

[51] Int. Cl.$^7$ .................................................. B01D 53/14
[52] U.S. Cl. ...................... 423/230; 423/219; 423/239.1
[58] Field of Search .................................. 423/219, 230, 423/247, 248, 648.1, 658.2, 239.1

[56] References Cited

U.S. PATENT DOCUMENTS

| | | | |
|---|---|---|---|
| 5,080,875 | 1/1992 | Bernauer | 423/658.2 |
| 5,489,327 | 2/1996 | Otsuka et al. | 95/116 |
| 5,492,682 | 2/1996 | Succi et al. | 423/210 |
| 5,558,844 | 9/1996 | Succi et al. | 423/230 |

OTHER PUBLICATIONS

Heimbach, H. et al. "Removal of Nitrogen and Methane from Hydrogen by Metal Getters," *Fusion Technology*, 1984, vol. 7, pp 421–426.

Albrecht, H., et al. "Application of SAES and HWT gas Purifiers for the Removal of Impurities from Helium–Hydrogen Gas Mixtures", J. of the Less–Common Metals, vol. 172–174 (1991), pp 1157–1167.

Dr. D'Arcy H. Lorimer, "Advances in Hydrogen Purification Technologies", 1992 Microcontamination Conference Proceedings, pp 819–825.

S.N. Ketkar and Martinez de Pinillos, "Calibrating APIMS for $H_2$ Measurements Using a Palladium Purifier", 1993 Proceedings—Institute of Environmental Science, pp 50–54.

*Primary Examiner*—Steven P. Griiffin
*Assistant Examiner*—Peter DiMauro
*Attorney, Agent, or Firm*—David H. Jaffer

[57] ABSTRACT

A metal hydride getter purifier operated at less than 350° C. to remove impurities such as carbon dioxide, carbon monoxide, nitrogen, oxygen and water to levels of the order of one ppb or less from hydrogen without creating greater than 10 ppb methane. A cryogenic stage after the getter stage may be used to ensure removal of methane from hydrogen.

4 Claims, 2 Drawing Sheets

IMPURITY CONCENTRATIONS IN HYDROGEN AS A FUNCTION OF TEMPERATURE

HYDROGEN PURIFICATION USING METAL HYDRIDE GETTER MATERIAL

This application is a continuation of application Ser. No. 08/546,129 filed on Oct. 20, 1995, now abandoned.

BACKGROUND OF THE INVENTION

1. Field of the Invention

The invention relates generally to a method and apparatus for removal of impurities from hydrogen. In particular, the invention relates to a method and apparatus which achieves removal of contaminants to below 1 part per billion (ppb), using a purifier containing a metal hydride getter stage operated at temperatures below 350° C.

2. Brief Description of the Prior Art

Hydrogen is widely used in the semiconductor processing industry. As processing requirements become more stringent, the need for higher purity hydrogen sources increases. A variety of hydrogen purification techniques have been used. None of these methods is capable of producing purified hydrogen with sub-ppb levels of methane in the quantities required for most semiconductor manufacturing operations. (See Lorimer, D. H., "Advances in Hydrogen Purification Technologies", 1992 Microcontamination Conference Proceedings 819–825, and Ketkar, S. N., and Martinez de Pinillos, J. V., "Calibrating APIMS for $H_2$ Measurements Using a Palladium Purifier", 1993 Proceedings: Institute of Environmental Sciences 50–54, both of which are incorporated herein by reference).

Getter alloy formulations have been used to remove impurities in hydrogen. In getter purification systems a metal alloy formulation reacts irreversibly with impurities present in hydrogen gas, leaving a purified hydrogen output. Purification is typically carried out in heated packed bed type reactors at temperatures of from 350° C. to greater than 500° C. These systems remove oxygen, water vapor, and nitrogen present in feed gas in amounts up to ppm quantities. However, at these high temperatures methane is created either from conversion of CO or $CO_2$ to $CH_4$, or from conversion of $H_2$ to $CH_4$, resulting in high methane levels of impurities in the purified hydrogen.

A variation of the getter purification method utilizes special adsorption beds placed upstream from a getter purifier. The system works on the theory that the special adsorption beds will remove carbon dioxide and carbon monoxide, thereby reducing the carbon concentration reaching the getter bed.

SUMMARY OF THE INVENTION

It is an object of the present invention to provide a method and apparatus for removal of impurities from hydrogen to levels below 10 ppb.

It is a further object of the present invention to provide a method and apparatus for removal of impurities from hydrogen to levels below 1 ppb.

It is yet another object of the present invention to provide a method and apparatus for removal of methane from hydrogen to levels below 10 ppb.

It is another object of the present invention to provide a method and apparatus for removal of methane from hydrogen to levels below 1 ppb.

Another object of the present invention is to provide a method and apparatus for removal of impurities, including methane, from hydrogen in which impurities are removed in a getter purification step at temperatures of less then 350° C.

Briefly, the preferred embodiment of the present invention utilizes a getter purifier operated at less than 350° C., (preferably less than 300° C. and most preferably at about 280° C.) to remove impurities such as carbon dioxide, carbon monoxide, nitrogen, oxygen, water, and methane to levels of the order of one ppb or less from hydrogen. By maintaining the temperature at about 280° C., the amount of methane created within the getter purifier vessel is minimal. A cryogenic stage after the getter stage may be used to ensure removal of methane from hydrogen sources containing relatively high methane impurity levels.

IN THE DRAWINGS

DETAILED DESCRIPTION OF THE PREFERRED EMBODIMENT

Figure 1:
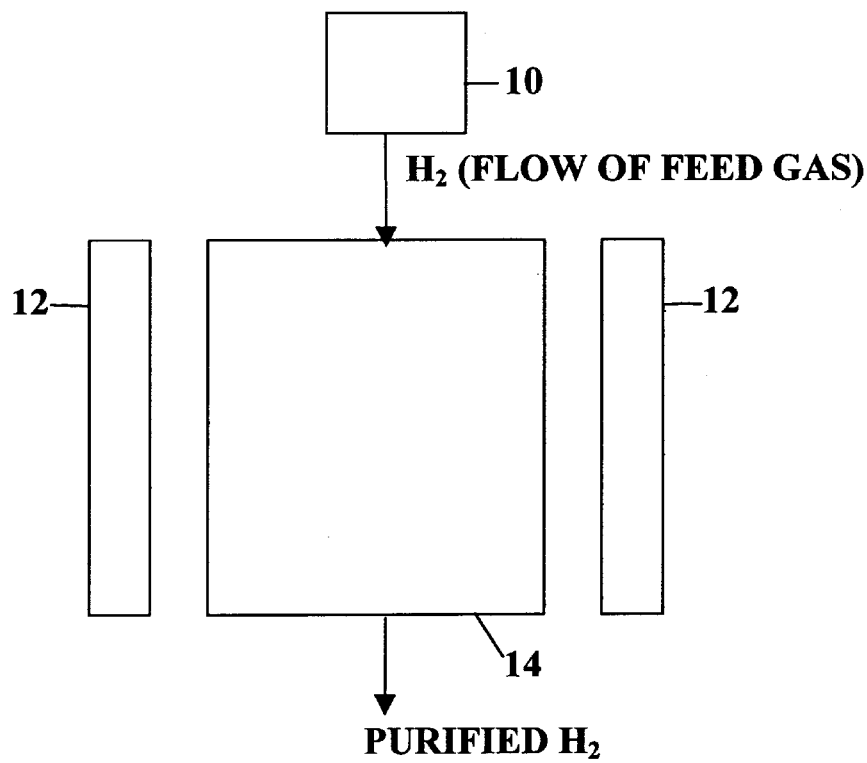
FIG. 1 is a plan view of a single-stage hydrogen purifier system in accordance with the present invention.

As described above, getter alloys have been used to remove impurities from hydrogen. The purifiers used in these operations have involved multiple stages, and the getter alloys have been typically operated at temperatures of 400° C. or higher. We have found that operation of purifiers at these high temperatures during purification of hydrogen results in creation of methane from either the getter or the stainless steel vessels in which the getters are housed. In many cases, the outlet impurity level of methane is significantly higher than the purity levels in the feed gas source. In one example, we have conducted a test utilizing hydrogen feed gas with a level of 2.3 ppm of added methane and 1 to 2 ppm each of added CO and $CO_2$ run through a getter purifier of the type described below, operated at 500° C., we have determined by gas chromatography that although the input level is 2.3 ppm of methane, the output level is 3.8 ppm of methane. In a second example, we purified a hydrogen feed gas specified at 99.999 percent purity (maximum impurity levels of 10 ppm), with no added impurities. We found that actual concentrations of contaminants in the feed gas typically are much lower than 10 ppm total, with methane and CO impurities typically in the order of less than 1 ppb, and $CO_2$ impurities typically in the order of 50–100 ppb. With this feed gas we have found that the operation of a getter purifier at 500° C. results in an impurity level of less than 100 ppb of methane. We believe that in the purification of hydrogen which is specified as pure to 99.999 percent, operation of the getter purifier vessel at high temperature (greater than 350° C.) results in the creation of most of this methane.

There are at least two plausible explanations for the methane production. The first is that when high concentrations of carbon monoxide and/or carbon dioxide reach the heated getter stage, they may react with hydrogen via the following reactions:

$$CO + 3H_2 \rightarrow CH_4 + H_2O$$

$$CO_2 + 4H_2 \rightarrow CH_4 + 2H_2O$$

Since this reaction probably takes place within the getter bed, the water generated is subsequently removed within the getter stage and is not detected at the output of the purifier. Another explanation for methane creation is that it is possible for hydrogen to methanize carbon in the stainless steel of the purifier vessel via the following reaction:

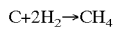

$C + 2H_2 \rightarrow CH_4$

We have found that operation of a hydrogen purifier including a getter stage operated at less than 350° C. (preferably between 250° C. to 300° C., and most preferably at about 280° C.), reduces creation of methane in the getter vessel while still effectively removing other impurities. Two preferred embodiments of the present invention are described below. The first embodiment utilizes a single purification vessel with a getter material operated at a temperature less than 350° C., and preferably at about 280° C. For continuous operation, the getter should be operated at a sufficiently high temperature (250° C. or greater) to allow diffusion of impurities from the surface into the bulk of the getter alloy. At temperatures of less than 250° C., the purification would end as soon as the impurities coated the surface of the getter, therefore, the purification would not be continuous. This first embodiment is suitable for purification of hydrogen having very low levels of methane. For example, liquid hydrogen used as a source of gaseous hydrogen typically contains levels of methane below 1 ppb. Other impurities, such as carbon dioxide, carbon monoxide, nitrogen, oxygen, and water may be present at higher levels. The challenge with such a source of hydrogen is to remove these other impurities without introducing unacceptable levels of methane. As discussed above, getter purifiers for hydrogen purification historically have been operated at temperatures above 350° C. While this operation regime removes most impurities, it causes introduction of unacceptable levels of methane.

Referring to FIG. 1, a plan view of a hydrogen purifier system in accordance with the single-stage embodiment of the present invention is shown. A hydrogen feed gas source 10 provides the hydrogen which is to be purified. The hydrogen is passed into a stainless steel purifier vessel 14 where it is contacted with a getter material. The temperature of the vessel is preferably maintained at approximately 280° C. by heater 12, which is placed around purifier vessel 14. Purified hydrogen exiting vessel 14 is ready for use. The vessel includes suitable internal support assemblies for the getter bed.

A variety of metal hydride getter materials are suitable for this purifier. The hydrides of zirconium and titanium alloys, such as those listed in Table 1, are preferred.

TABLE 1

| | Alloy Weight Percent (before hydriding) | | | | |
|---|---|---|---|---|---|
| Alloy ID | Al | Ti | V | Fe | Zr |
| 1 | — | — | — | 26.4 | 73.6 |
| 2 | — | — | 1.8 | 29.0 | 69.2 |
| 3 | 1.9 | — | 28.1 | 4.4 | 65.6 |
| 4 | — | 6.8 | 26.3 | 9.9 | 57.0 |
| 5 | 1.7 | 18.1 | 19.5 | 19.0 | 41.7 |
| 6 | 1.5 | 13.1 | 21.2 | 15.3 | 48.9 |

A zirconium/vanadium/titanium/iron hydrided alloy (having the composition of Alloy 4 in Table 1) was used for the results described below, but other getters such as those listed in Table 1 are suitable. The typical particle size was 0.1 to 1 micrometers.

Figure 2:
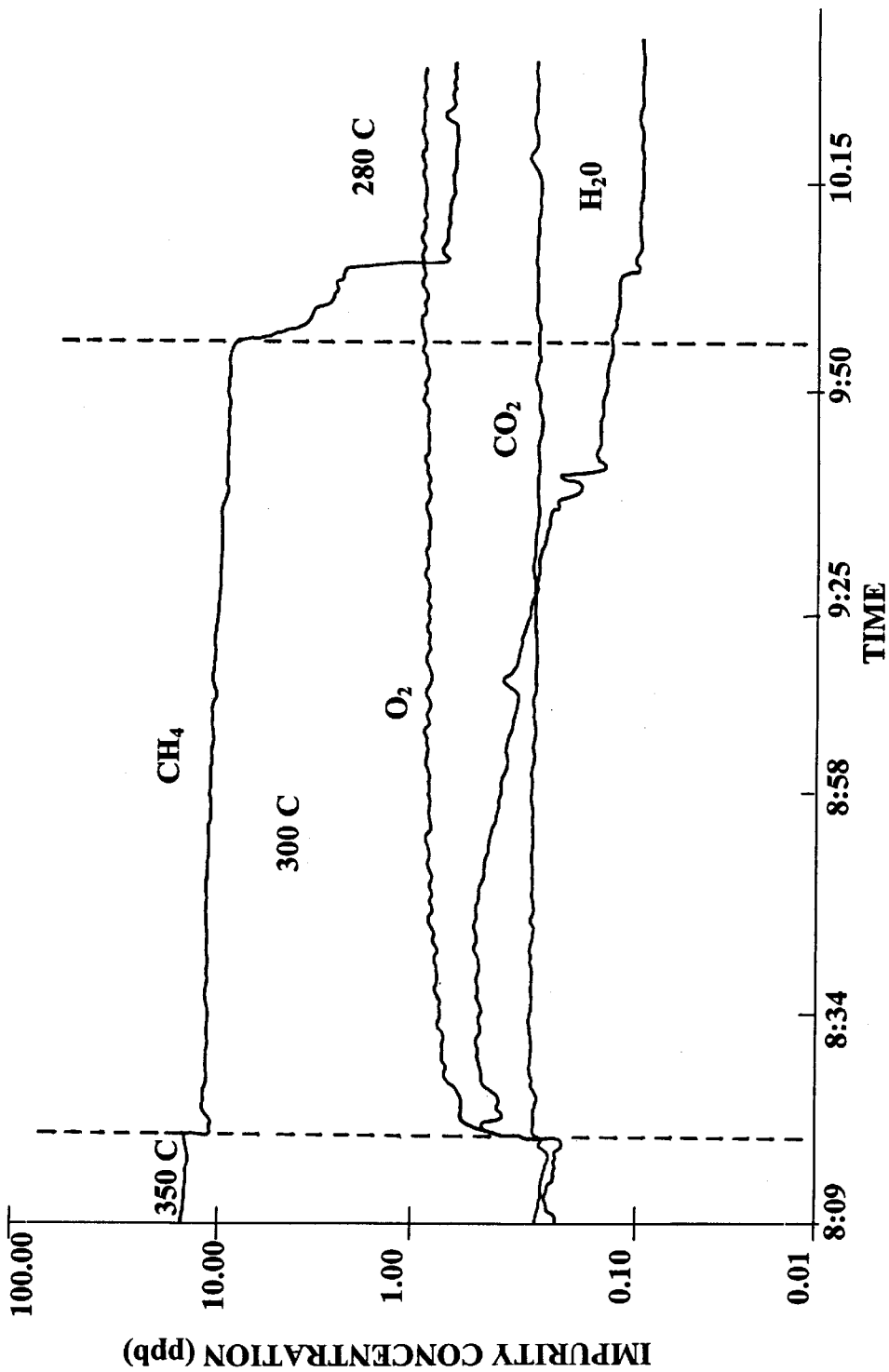
FIG. 2 is a graph showing impurity concentrations in purified hydrogen as a function of temperature.

With reference to FIG. 2, operational results of a hydrogen purifier in accordance with the present invention are shown. At 350° C., methane levels were above 10 ppb. When reduced to 300° C., methane levels were reduced to less than 10 ppb. When the temperature was further reduced to 280° C., the methane decreased to less than 1 ppb. This test was conducted at a flow rate of 40 l/min in a vessel having the following dimensions: 41.06 inches in length by 4 inches outside diameter by 3.834 inches inside diameter. The feed gas was commercial grade gaseous hydrogen (specified at 99.5% purity). As noted above, the key to this method of purification for hydrogen sources containing low levels of methane is to prevent introduction of methane during removal of other impurities. FIG. 2 demonstrates that at operational temperatures above 350° C., unacceptable levels of methane would be introduced. Thus, below 350° C. the getter still removes oxygen, carbon, and nitrogen compounds (which are diffused into the getter), and the relatively low temperature of operation avoids creation of unacceptable levels of methane.

The system shown in FIG. 1 is activated by initially heating the vessel to a temperature of between 350° C. to 450° C. while purging with hydrogen or a mixture of argon and hydrogen. The purifier then is operated in the sub-350° C. regime for hydrogen purification.

The embodiment described above is suitable for purification of hydrogen from sources having low methane levels, and focuses on removal of other impurities without introducing methane. A second preferred embodiment of the present invention utilizing two purification stages is suited for purification of hydrogen feed gas having higher methane levels. The first stage is similar to that described above, with a getter material operated at a temperature less than 350° C., preferably between 250° C. to 300° C., and most preferably at approximately 280° C. A second cryogenic stage having a sorption material such as a charcoal and/or molecular sieve follows the initial getter stage. In this embodiment, the first getter stage of the purifier is effective at removing impurities such as carbon dioxide, carbon monoxide, nitrogen, oxygen, and water to below 1 ppb levels. Methane is present in levels in the order of 10 ppm or less. At the exit of the first getter stage, this level of methane is the sum of the amount of methane available in such commercial grade gas and the levels of methane added by the first stage of the getter purifier. It may be beneficial in the case of commercial grade gas (99.99% purity instead of 99.999% purity) to operate at slightly higher temperatures (greater than 300° C. or even greater than 350° C.) in order to have higher diffusion rates of impurities into the getter bulk. The cryogenic stage then removes methane to levels on the order of or below 1 ppb, so that the concentration of impurities in the purified hydrogen stream is again below 1 ppb.

Figure 3:
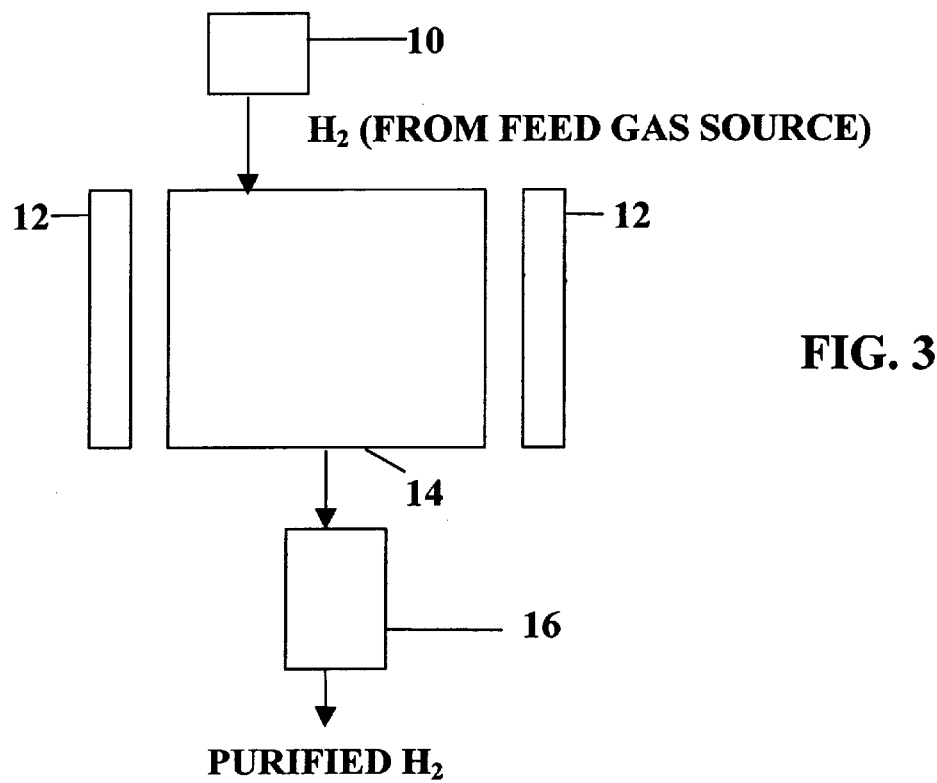
FIG. 3 is a plan view of a two-stage hydrogen purifier system in accordance with the present invention.

With reference to FIG. 3, a purifier in accordance with this second preferred embodiment is shown. The first stage 14 is fully described above and utilizes the same getter hydride as discussed above. The second stage of the purifier contains a purifier vessel 16 cryogenically chilled to liquid nitrogen temperatures. This purifier is filled with a high surface area sorption material, such as activated charcoal powder and/or molecular sieve. The activated charcoal powder typically has a particle size distribution wherein 10–15% of the particles are less than 74 $\mu$ in size and 70–75% of the particles are less than 10 $\mu$ in size. The surface area of the activated charcoal is approximately 95 mm$^2$/gram. Favorable results are obtained with molecular sieves having pore diameters of approximately 5 Å, however, other pore size molecular sieves can be used. Within this second stage, methane is removed to below 1 ppb.

Periodic regeneration of the charcoal and/or molecular sieve stage is required. Regeneration is achieved by removing the cooling apparatus and heating the stage to a temperature of a minimum of 20° C., preferably greater than 80° C., with the most complete regenerations taking place at higher temperatures of about 250° C. to 350° C. for a period of approximately 2 to 6 hours. Following regeneration, the purifier is ready to be chilled again.

The present invention allows for repeated and simple regeneration of the purifier. If the molecular sieve and/or activated charcoal begins to become saturated with impurities, the purified gas will show an increasing level of impurities.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A single stage method for purification of a hydrogen gas flow from a hydrogen gas source having less than 1 ppb of methane, wherein less than 5 ppb additional methane is generated into the hydrogen gas flow, and wherein impurities including nitrogen and carbon oxides and other impurities selected from the group consisting of oxygen and water are each reduced below 5 ppb in the hydrogen gas flow, comprising contacting the hydrogen gas flow with a metal hydride getter material in a single stage purification vessel, where the metal hydride getter material is operated at a temperature between 250° C. and about 290° C.

2. The method of claim 1, wherein the getter is selected from the group consisting of alloys containing zirconium or alloys containing titanium.

3. The method of claim 1, wherein less than 1 ppb additional methane is generated, and wherein the metal hydride getter material is operated at a temperature between 250° C. and about 280° C.

4. The method of claim 3, wherein the getter is selected from the group consisting of alloys containing zirconium or alloys containing titanium.

* * * * *